(12) United States Patent
Hovland et al.

(10) Patent No.: US 11,978,147 B2
(45) Date of Patent: May 7, 2024

(54) 3D RENDERING

(71) Applicant: NOVORENDER AS, Sandnes (NO)

(72) Inventors: Tore Hovland, Røyneberg (NO); Tore Lode, Stavanger (NO); Dmitry Kuznetsov, Saint-Petersberg (RU)

(73) Assignee: NOVORENDER AS, Sandnes (NO)

( * ) Notice: Subject to any disclaimer, the term of this patent is extended or adjusted under 35 U.S.C. 154(b) by 33 days.

(21) Appl. No.: 17/783,050

(22) PCT Filed: Dec. 18, 2020

(86) PCT No.: PCT/EP2020/087271
§ 371 (c)(1),
(2) Date: Jun. 7, 2022

(87) PCT Pub. No.: WO2021/123346
PCT Pub. Date: Jun. 24, 2021

(65) Prior Publication Data
US 2023/0018168 A1 Jan. 19, 2023

(30) Foreign Application Priority Data
Dec. 20, 2019 (NO) .................................. 20191519

(51) Int. Cl.
G06T 15/00 (2011.01)
G06T 15/04 (2011.01)

(52) U.S. Cl.
CPC ............ *G06T 15/005* (2013.01); *G06T 15/04* (2013.01); *G06T 2200/24* (2013.01)

(58) Field of Classification Search
CPC ... G06T 15/005; G06T 15/04; G06T 2200/24; G06T 17/00; G06F 8/315; G06F 16/289
See application file for complete search history.

(56) References Cited

U.S. PATENT DOCUMENTS

2015/0287165 A1   10/2015  Berghoff
2019/0066370 A1   2/2019   Schmalstieg et al.
2022/0180594 A1*  6/2022   Guan .................... G06T 7/0002

FOREIGN PATENT DOCUMENTS

EP          3499465          12/2018
WO    WO 2018/222495 A1     12/2018

OTHER PUBLICATIONS

Anonymous: "C++—Dynamically Packing Data for Vertex Buffer Objects of OpenGL—Stack Overflow", Oct. 16, 2013, pp. 1-2, Retrieved from Internet: URL: https://stackoverflow.com/questions/19396193/dynamically-packing-data-for-vertex-buffer-objects-of-opengl.

(Continued)

*Primary Examiner* — Antonio A Caschera
(74) *Attorney, Agent, or Firm* — Ballard Spahr LLP

(57) ABSTRACT

Conventional 3D data models typically stored in a vertex buffer are processed so that all geometry is combined to one big geometry per node as a Vertex Buffer Object (VBO). The vertex contains position (x,y,z), Normal (x,y,z), but also an Object ID for each object. Further, a metadata database is created where all additional information is stored, and if there are multiple geometries in the same object, multiple Object IDs to the same metadata entry are added under primitives. By extracting metadata and Materials, it is made possible to handle a node as a single VBO.

7 Claims, 5 Drawing Sheets

(56) References Cited

OTHER PUBLICATIONS

International Search Report and Written Opinion were dated Apr. 29, 2021 by the International Searching Authority for International Application No. PCT/EP2020/087271 filed on Jun. 22, 2020 and published as WO 2021/123346 (Applicant—Novotech AS) (9 pages).
International Preliminary Report on Patentability were dated Mar. 28, 2022 by the International Searching Authority for International Application No. PCT/EP2020/087271 filed on Jun. 22, 2020 and published as WO 2021/123346 (Applicant—Novotech AS) (17 pages).

* cited by examiner

3D RENDERING

CROSS-REFERENCE TO RELATED APPLICATIONS

This application is a U.S. National Phase Application of International Application No. PCT/EP2020/087271, filed Dec. 18, 2020, which claims priority to Norwegian Application No. 20191519, filed Dec. 20, 2019, each of which are hereby incorporated by reference in their entirety.

TECHNICAL FIELD

Embodiments herein relate to a method, a computer program and an arrangement for rendering three dimensional (3D) scenes with limited processor and memory capacity.

BACKGROUND

Computer graphics is a core technology in digital photography, computer aided drawing (CAD) film, video games, cell phone and computer displays with many specialized applications. A great deal of specialized hardware and software has been developed, with the displays of most devices being driven by computer graphics hardware.

Many tools have been developed to visualize data in a graphical User Interface (GUI). Computer generated imagery can be categorized into several different types: two dimensional (2D), 3D, and animated graphics. As technology has improved, 3D computer graphics have become more common, but 2D computer graphics are still widely used. The GUI may be in the form of a screen or display, and these terms may be used interchangeably herein.

For example, to render a 3D model on a 2D screen, the 3D model needs to be remodeled, the data comprised in the 3D model needs to be simplified etc. in order to be able to render it on a 2D screen. This requires manual labor. In addition, the whole process needs to be started over again each time the original 3D model is updated or changed.

3D models are most-often represented as triangulated polyhedra forming a triangle mesh. Non triangular surfaces can be converted to an array of triangles through tessellation. Attributes from the vertices are typically interpolated across mesh surfaces. A 3D model may be referred to as a 3D scene, and these terms may be used interchangeably herein.

An illustration of a typical rendering pipeline in computer graphics is shown in FIG. 1. The rendering pipeline is the process by which images are prepared and output onto the screen. The graphics rendering pipeline takes the 3D objects built from primitives described using vertices, applies processing, calculates the fragments and renders them on the 2D screen as pixels.

A vertex (plural vertices) in computer graphics is a data structure that describes certain attributes, like the position of a point in 2D or 3D space, or multiple points on a surface. A vertex typically includes the following information:
  Position identified by coordinates in 3D space (x, y, z).
  Color as an RGBA value, i.e. R, G and B for the red, green, and blue channels, alpha for transparency—all values range from 0.0 to 1.0.
  Normal describing the direction the vertex is facing.
  Texture being a simple 2D image that the vertex can use to decorate the surface it is part of instead of a simple color.
  A Primitive is an input to the pipeline which is built from vertices and can be a triangle, point or line. A fragment is a 3D projection of a pixel, which has all the same attributes as a pixel, and a pixel is a point on the screen arranged in the 2D grid, which holds an RGBA color.

Further referring to the illustration in FIG. 1, the vertex processing 101 combines the information about individual vertices into primitives and setting their coordinates in the 3D space for the viewer to see. There are usually four stages to this vertex processing 101: The first one involves arranging the objects in the surroundings and is called model transformation. The second one is view transformation which takes care of positioning and setting the orientation of the camera in the 3D space. The third one is projection transformation defining the camera settings. It sets up what can be seen by the camera including field of view, aspect ratio and optional near and far planes. The fourth step is viewport transformation, which involves outputting everything for the next step in the rendering pipeline.

The rasterization process 103 indicated in FIG. 1 converts primitives, —which are connected vertices—to a set of fragments. Those fragments—which are 3D projections of the 2D pixels—are aligned to the pixel grid, so eventually they can be printed out as pixels on a 2D screen during the output merging stage. A screen may also be referred to as a display.

The fragment processing 105 illustrated in FIG. 1 completes the scene by providing textures and lighting, calculating final colors based on the given parameters.

The final process illustrated in FIG. 1 is output merging 108. During the output merging 108, all the fragments of the primitives from the 3D space are transformed into a 2D grid of pixels that are then printed out on the screen. The output merging may be referred to as output manipulation. During output merging, some processing is also applied to ignore information that is not needed—for example the parameters of objects that are outside of the screen or behind other objects, and thus not visible, are not calculated.

A basic function utilizing the result of the rendering pipeline illustrated in FIG. 1, is the draw call. Basically, a draw call contains all the information telling a Graphics Processing Unit (GPU) about textures, states, shaders, rendering objects, buffers, etc. encapsulated as CPU work that prepares drawing resources for the graphics card. The draw call may be referred to as a render call or object call. The draw call may be described as a call, command, instruction, request or query sent to the GPU to draw objects on a screen e.g. draw a valve on the screen/GUI. A draw call is known to be a heavy process, i.e. it requires a large amount of processing capacity.

Converting state vectors, i.e. all the information mentioned before, to hardware commands for the GPU is very expensive in terms of processing capacity for the CPU and GPU. In modern GPUs, the vertex processing stage and fragment processing stage are programmable. It is possible to write programs, known as vertex shader and fragment shader to perform a custom transform for vertices and fragments. A program may be referred to as a script, and a program may be pre-programmed.

All objects in a 3D scene have their own draw object, one draw call per draw object, and the objects are arranged in an object hierarchy describing the objects in the 3D scene and data connected to each object. The data connected to each object may be referred to as metadata.

Since a draw call is required for each different material, having a variety of unique objects in multiple different materials, the number of draw calls is raised accordingly. Since CPU work to translate this information to GPU hardware commands takes time, sometimes we see CPUs bottlenecking GPUs exactly with a high number of draw calls involved.

Small computer units like smart phones and PCs with limited CPUs and GPUs, do not have the capability to render large 3D views and especially not real-time 3D rendering, in the cases of e.g. moving around among and selecting/highlighting large 3D objects.

In an example where the 3D scene or 3D model represents an oilrig, the 3D scene comprise a large number of objects such as pipes of various length and diameter, valves, handles etc. For example, the 3D scene representing an oilrig may comprise around 80 000 objects. Since each object in an oilrig have their own draw call, there will be a large amount of draw calls, e.g. 80 000 draw calls. The CPU needs to perform a large amount of draw calls to the GPU which may overload the CPU. This may result in the GPU being in idle mode as the CPU cannot serve the GPU fast enough. This causes the frame rate for rendering the 3D scene on the GUI to be extremely low, e.g. 3.8 frames per second (FPS) and is CPU bound. Simulations done for 80 000 draw calls in an oilrig have shown that it leads to a CPU load of close to 54% and a GPU load of 13%, and FPS at 3.4.

The geometry of a 3D scene such as an oilrig is complex in that it comprises a large amount of objects, there are a large amount of different object types, etc., which requires powerful hardware components when rendering the 3D scene using current technology Furthermore, with for example 80 000 objects in a complex 3D scene such as an oilrig, the total amount of data connected to all objects, i.e. the metadata, is also very large. The metadata for one object may be in the range of 100 MB and in some cases GBs. Therefore, there is a need for a solution enabling selection and rendering of a 3D scene with multiple 3D objects, without requiring a draw call for each selectable object and to keep the whole object hierarchy in memory. A 3D scene may be for example an oil rig, a house etc. The 3D scene may be referred to as a big 3D scene. The term big refers to a scene in the size range of for example an oilrig, a house, a highway, a tunnel or similar.

SUMMARY

In view of the above, an object of the present disclosure is to overcome or at least mitigate drawbacks of prior art.

In particular, a method for rendering a 3D scene defined by primitives including a number of objects associated with respective vertices to a GUI by means of a GPU is provided, including the steps of processing the 3D scene by creating one unique Object Identity (ID) common to each vertex included in the same respective primitive, adding in a metadata database at least one metadata entry per primitive, and if there are multiple primitives associated with the same object, multiple Object IDs are correspondingly added to the same metadata database entry, retrieving material properties from one or more material atlases by means of Object IDs, and for each unique material and/or object of the 3D scene, corresponding shader properties are set, and a draw call is made to the GPU, rendering out a 2D image in a Frame Buffer by means of a shader, containing the 2D image to be shown on the GUI.

In another aspect, there is provided a computer program comprising instructions which, when executed on at least one processor in a control unit, cause the control unit to carry out the method according to the aspect summarized above.

These further aspects provide the same effects and advantages as for the first aspect summarized above.

DETAILED DESCRIPTION

Conventional 3D data models typically stored in a vertex buffer, i.e. a VBO, are processed so that all geometry is combined to one geometry per node, i.e. per object. The processing may be referred to as a preprocessing. The vertex contains position (x,y,z), Normal (x,y,z), but also an Object ID for each object. The object may be a 3D object, and the object is a selectable object or clickable object. The vertices are combined to create e.g. triangles. Further, a metadata database, is created where all additional information is stored, and if there are multiple geometries in the same object, multiple Object IDs to the same metadata database entry are added under primitives. The additional information is all additional information except information related to geometry and material. The database may be described as comprising attributes or textual information associated with the object. The metadata database comprises metadata, i.e. all additional information. The metadata is associated with the Object ID, and not the GUI, e.g. a screen. This makes it different from the metadata disclosed in e.g. US 2015/0287165 A1 which is associated with the screen, not the image. For being able to make draw calls, the memory or video memory, e.g. comprised in the user's mobile phone, tablet computer, laptop, in a central server or similar etc, stores Object ID arranged in a hierarchical fashion, geometry for each object and object material. The Object ID may be a 3 Byte number, a 4 Byte number of any other suitable number of bytes, that is added to each vertex in the geometry process pipeline. Each object has a unique Object ID and each vertex will contain the same unique Object ID for a certain object.

By extracting metadata from the medatdata database and object materials, it is made possible to handle a whole 3D model as a single Vertex Buffer Object (VBO). This is highly efficient instead of doing one draw call per object, as in the prior art.

Figure 1:
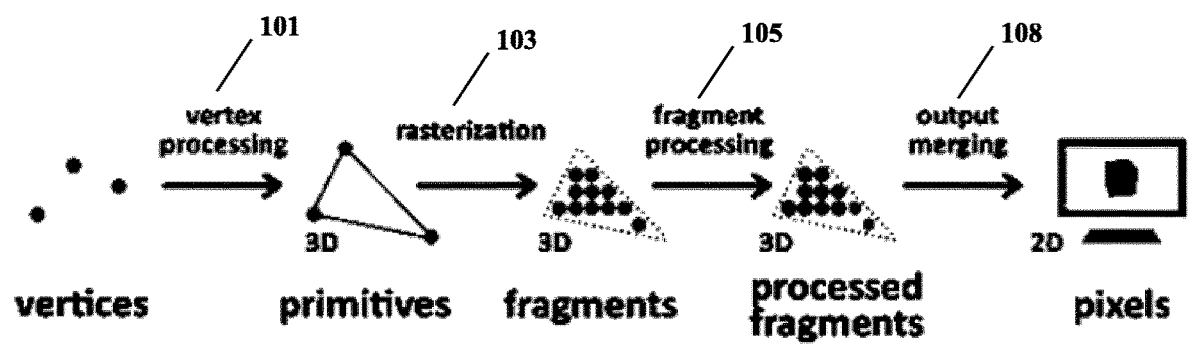
FIG. 1 is an illustration of a typical rendering pipeline in computer graphics.
Figure 2:
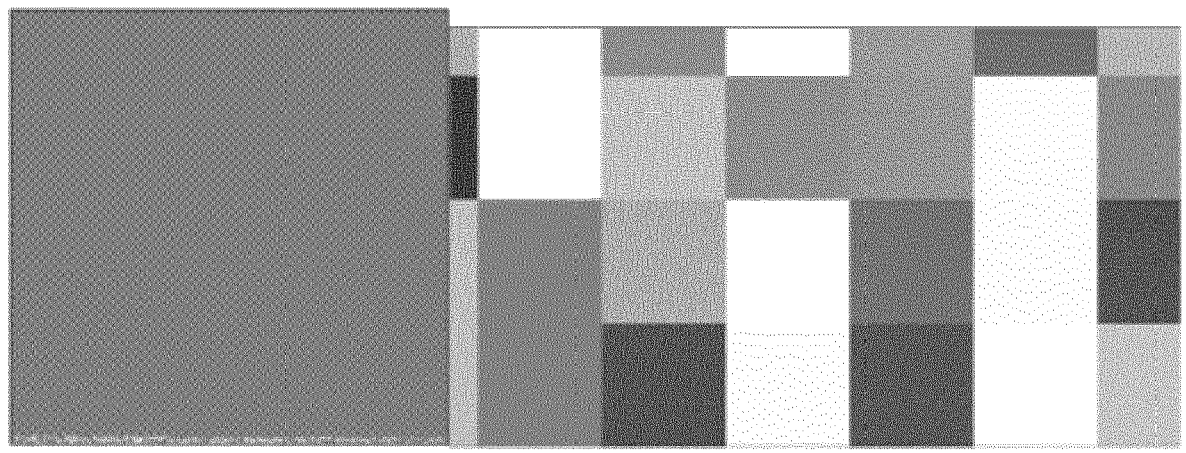
FIG. 2 shows an example of a material atlas.

The Object ID, metadata and object materials are then used in shader to retrieve material properties from a material atlas. An example of a material atlas is shown in FIG. 2. Material atlas can be seen as a set of "textures". Textures are in turn images being used to describe the color value of a vertex. To find the color value, the Object ID is counted from bottom left 0.0. This will return an associated value for a certain Object ID, which is then used as the pixel value for the RGB value of the vertex. In FIG. 2 the diffuse color atlas on the left hand side, and the same image but zoomed in to see individual pixels on the right hand side.

There may be multiple material atlases to describe color components like:

Diffuse color, e.g. core color

Emissive color, e.g. how much light it emits, think of a light bulb

Roughness and Metalness, e.g. how shiny or rough is it, think metal vs matt

Through one draw call only, many different materials may be shown instead of one material per draw call according to prior art.

Further, the material properties may also be combined in the shader, enabling to combine draw calls by significant values:

Transparent or opaque

Shading type, e.g: Phong, Physically-based, toon, lambert etc.

For each unique material and/or object of a 3D scene, shader properties are set, and a draw call is made to the GPU, which will render out a 2D image in the Frame Buffer, containing the 2D image to be shown on the screen.

A common action through a GUI is object picking, where an object being clicked on is shown/highlighted, e.g. in red, and the metadata is fetched as a result of the clicking. An additional render to a new Frame Buffer may be carried out. This means there may be two frame buffers, one containing the RGB values of the image, and one containing the Object ID encoded as RGB, e.g. Object ID frame buffer. A lookup in the metadata database (DB) is done by Object ID, and a change in the color value in material atlas is done also by Object ID, so that next time this object is rendered, the color changes.

Figure 3:
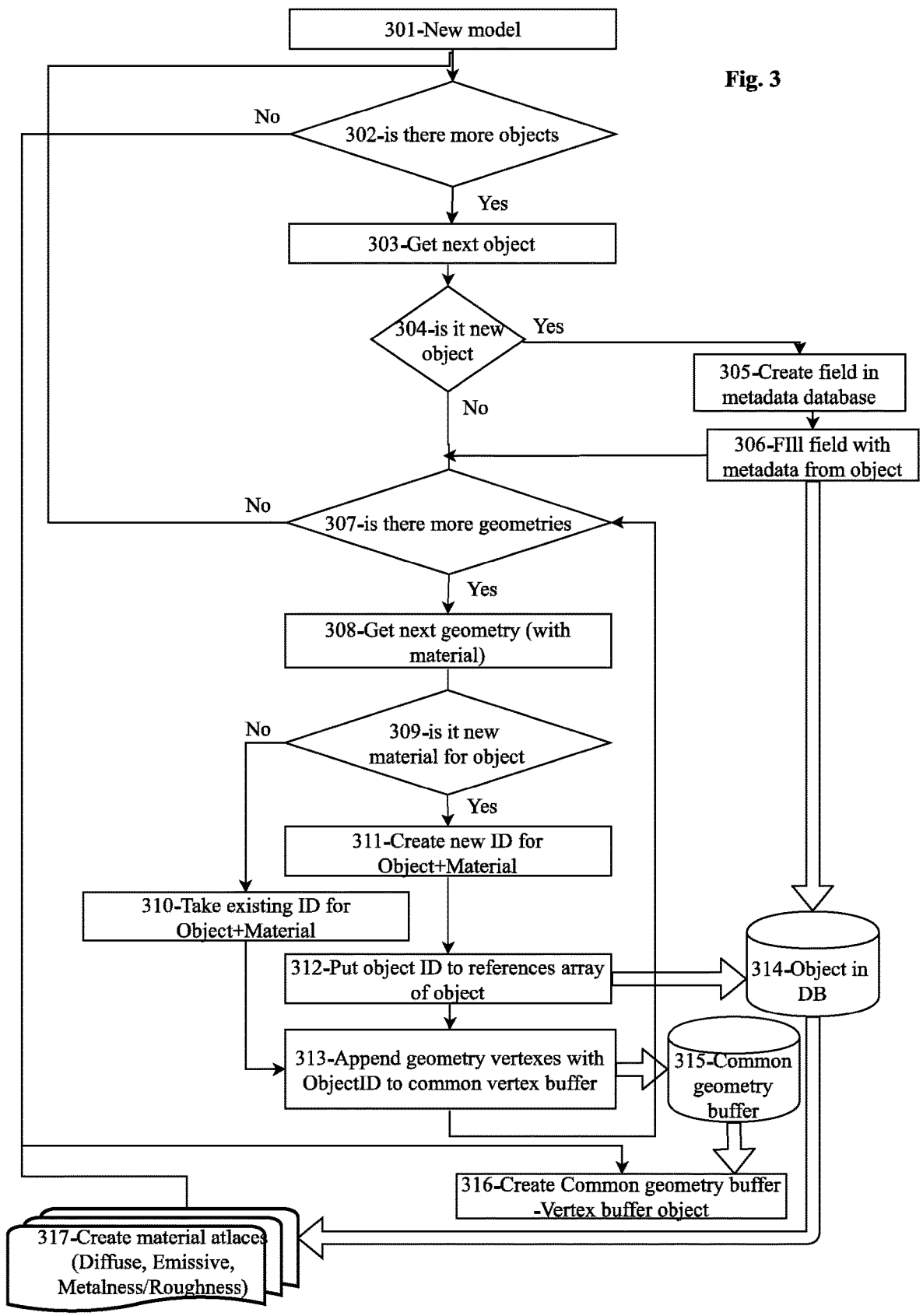
FIG. 3 is a flow chart illustrating an example of processing of 3D data.

FIG. 3 is a flow chart illustrating an example of preprocessing of 3D data. By referring to the numbers in the flow chart, the example is in the following detailly described.

A new model is loaded as a 3D model (301). The 3D model may be described as a model or representation of a real-world 3D scene, e.g. an oilrig, a house etc. The 3D model may be in any suitable 3D data format. The 3D scene may be provided from an external device, e.g. belonging to the oilrig manufacturer, and may be in a first data format, e.g. Ruby Version Manager (RVM), Industry Foundation Classes (IFC), Object (OBJ) and Standard for the Exchange of Product model data (STP). When the data is in the first data format it may or may not be necessary to convert the data to a second data format before being processed. The 3D model may be loaded automatically, it may be loaded directly from an external device, e.g. a memory storage of the oilrig manufacturer, the loading may be triggered by user input or by any other suitable means for triggering.

A 3D model normally contains multiple objects. Like the oilrig that contains the pipes described above. A pipe is an example of an object when the 3D model represents an oilrig. After loading, a check is performed to find out if there are more objects that have not been processed and that are not in the 3D model (302). The next object is then fetched (303) from the 3D model, and a check is performed to find out if it is a new object (304), i.e. an object that has not been processed and that is not in the 3D model.

For a new object, an object in the metadata database is made by creating a new field in the database for this object (305), and the metadata information which normally is text information describing the object, is filled in (306).

Some objects have multiple geometries. These geometries should be handled as one object, so by clicking one geometry, it should highlight all geometries in that object. A check is therefore performed to find out if there are more geometries (307). The next geometry with material is fetched, which may be different within the same object (308).

The next step is then to check if the same material for that object has been used before (309). If so, a new material will re-use the object's ID, so that existing ID for object+material is used (310). If it is a new material, a new Object ID for this geometry will be created to give that geometry a different color (311).

The next step is to put Object ID reference array to object (312). Even though the geometry has a different material, it is still part of the same object and should be handled as one object. This means retrieving the same metadata and highlight the other geometries if selected. The new Object ID is appended in primitives in the Metadata database. As each vertex contains the Object ID, geometry vertexes with Object ID is then appended to the common vertex geometry buffer (313).

A database (314) of all the Object ID with metadata and a common geometry buffer (315) are then filled up. The common geometry buffer contains all the vertex information, but as single vertexes. This is highly inefficient to render, as each set with vertexes would need its own draw-call to the GPU. A Common geometry buffer, in other words a VBO is therefore created (316). This is a highly efficient data that can be pushed to the GPU. In most cases, the VBO can be rendered as one draw-call. To do this a VBO is created. This can be stored in the GPU memory. With the prior art solution, each object in the 3D model requires a VBO, i.e. one VBO per object. With the present disclosure, each object does not require its own VBO, but all objects are combined in a few, but larger VBO's. Having fewer, but larger VBOs is efficient as it reduces the workload of the CPU which performs the task of creating the VBO's and providing them to the GPU.

The VBO may be implemented using OpenGL feature, DirectX or any other suitable Application Programming Interface (API).

Finally, material atlases are created (317). This is done by taking the material information about the object and storing it as textures with the associated Object ID, so that each vertex does not need to store material information, but gets its material by referencing its Object ID.

Figure 4:
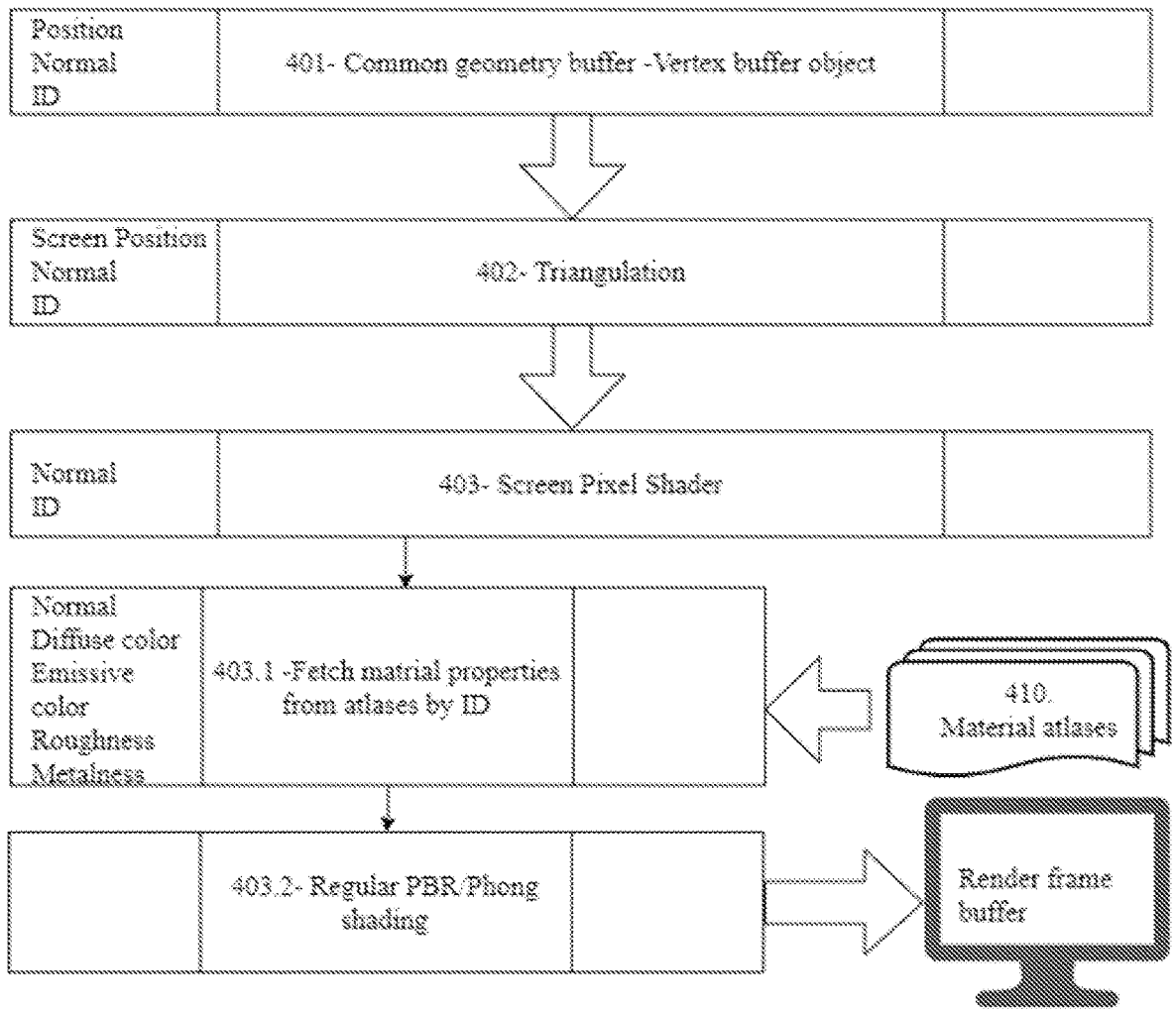
FIG. 4 is a flow chart illustrating an example of a rendering process.

FIG. 4 is a flow chart illustrating an example of rendering from a VBO and material atlases. By referring to the numbers in the flow chart, the example is described in the following.

The rendering is based on an existing VBO (401). From a VBO, it is possible to carry out a conventional triangulation (402) by taking the list of vertexes and creating triangles to be shaded in pixel shader. Vertex processing is as already indicated about combining the information about individual vertices into primitives and setting their coordinates in the 3D space.

The screen pixel shader then takes the primitives, e.g. triangles, and calculates the color of the triangle (403). This is done by fetching the material properties as follows:

The material properties are fetched from the material atlas 410 by Object ID (403.1)

The significant values are set in the shader, and the shader is run (403.2).

This will then produce a 2D images that is pushed to the frame buffer.

Figure 5:
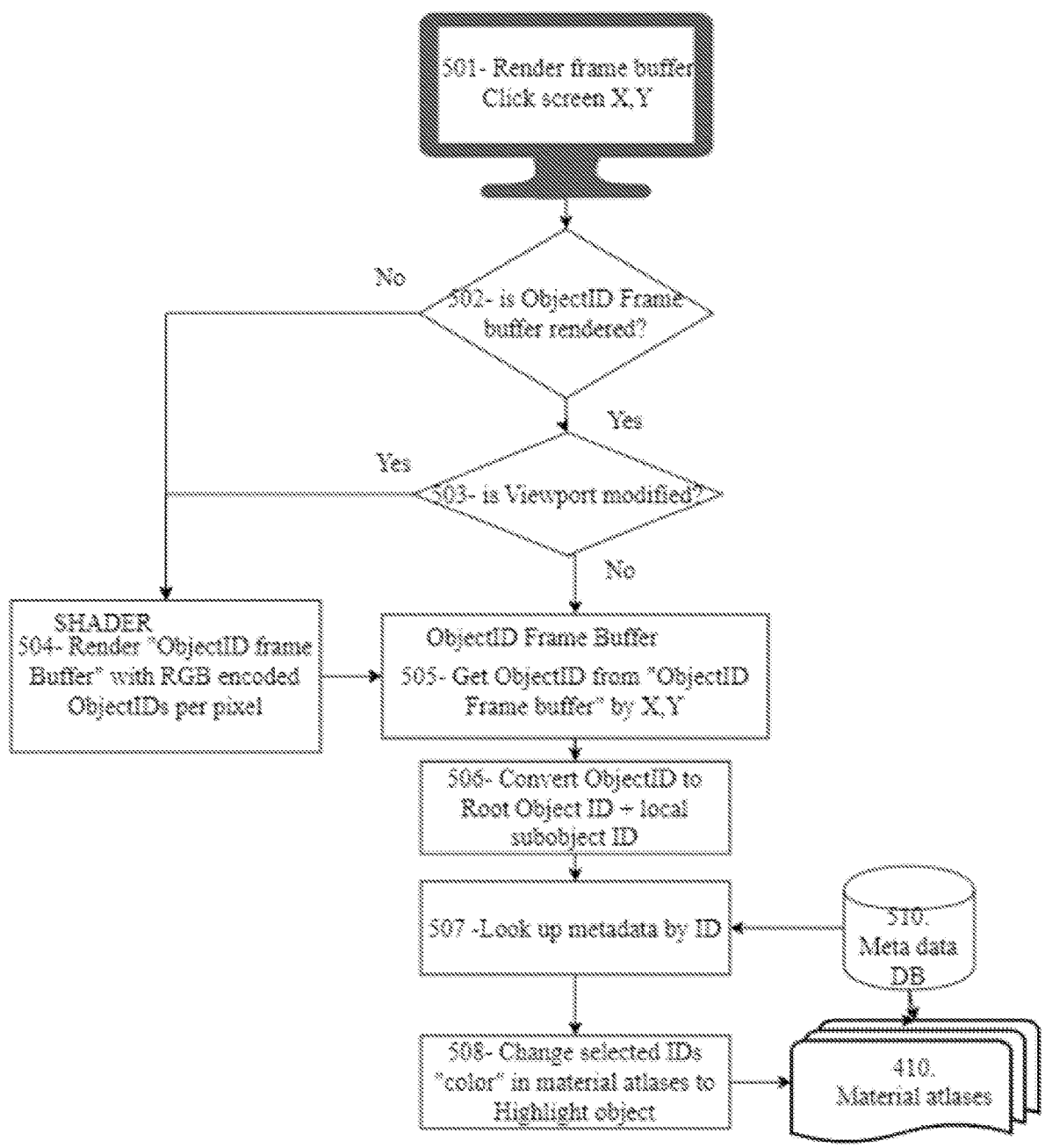
FIG. 5 is a flow chart illustrating an example of object picking.

FIG. 5 is a flow chart illustrating an example of object picking. By referring to the numbers in the flow chart, the example is described in the following.

The output of the rendering as discussed referring to FIG. 4, may be used for object picking is based on when a user clicks on the position X,Y in the 2D image seen in the screen of the 3D scene (501). When a user clicks on the position it refers to that the user marks, selects, highlights or activates the position or the object at the position as seen on the screen of e.g. his computer, mobile phone, tablet computer etc. The clicking may be done by the user by clicking on a computer mouse, by tapping on a touch screen with his finger or using a pen, the clicking may be voice activated or by any other suitable clicking device etc. When the user clicks on a position in the 3D scene, e.g. shown on a screen of a mobile phone, a check is performed whether the Object ID Frame buffer is rendered (502). If so, an additional check is performed whether user has moved his clicking device or a digital representation of the clicking device around in the 3D scene (503). If that is the case, an update of the Object ID frame buffer is required. If the Object ID Frame buffer is not rendered, this has to be done by a custom vertex and pixel shader that instead of finding the color values of each pixel, finds the Object ID and encodes it as a 2D RGB value and stores it as Object ID in the frame buffer (504). However, this frame buffer is never shown on the screen of the user's device, but is used as a lookup. If the user has not moved around in the 3D scene, the Object ID is fetched from the Object ID Frame buffer by X,Y. The user will see the regular frame buffer on the screen, but the Object ID frame buffer is underlined, so when the user clicks an X,Y position a lookup of which Object ID is clicked will be done.

A special case is to convert Object ID to Root Object ID+local subObject ID (506). Users may have multiple models in the same scene. A call to root objects, i.e. output from geometry processing pipeline, is then performed. When creating the Object ID frame buffer, storing what root Object the object originates is required, to know what meta-data DB and material atlas to search.

Now that the Object ID from step 505 and 506 is known, a lookup of metadata from the metadata DB 510 by this Object ID is done (507).

Finally, the selected Object ID's color in material atlases is changed to highlight what object has been selected (508), as discussed in the description above related to object picking.

The 3D scene may be any suitable 3D scene comprising multiple objects. An oilrig may be an example of a 3D scene, and the objects in an oilrig may correspond to pipes, valves, etc. An oilrig operator may click on a certain pipe in the representation of the oilrig that he sees on his tablet computer. This may result in that he gets information about the pressure inside the pipe, the temperature any other information associated with the pipe and is able to analyze the information and take necessary actions if the information indicates that. A house is another example of a 3D scene. In such 3D scene, an object may correspond to a board on the house façade. One of the boards may be clicked on or selected, and a search for span=3556.650000000002 may be initiated. This may result in all board's with that specific span value, and the user, e.g. the carpenter building the house, may see where he should be and make the appropriate amount of cuts on the boards. Other examples of the 3D scene may be a highway or a tunnel.

After the 3D scene has gone through the processing pipeline described herein, the data may be streamed to a User Equipment (UE), e.g. mobile phone, tablet computer, portable computer etc., on which a user can access and view the 3D scene, e.g. on the screen comprised in the UE. The metadata is loaded on demand when a user clicks a 3D object on the screen. The object ID is then used to find the appropriate metadata in the metadata database. The object ID makes all the object's searchable by metadata. The representation of the 3D scene rendered on the GUI may be described as a digital twin, i.e. a digital replica of the actual 3D scene. The digital twin seen on the GUI is adapted such that it can be zoomed into, rotated, etc., which has the advantage of accessing objects further into the 3D scene, accessing objects that are viewable when zoomed into but not in a 100% view.

In the example where the 3D scene represents an oilrig, the 3D scene comprises a large number of objects such as pipes of various length and diameter, valves, handles etc. For example, the 3D scene representing an oilrig may comprise around 80 000 objects. According to the prior art technology, each object in an oilrig have their own draw call, which leads to a large amount of draw calls, e.g. 80 000 draw calls. The CPU needs to perform a large amount of draw calls to the GPU which may overload the CPU. This may result in the GPU being in idle mode as the GPU cannot serve the GPU fast enough. This causes the frame rate for rendering the 3D scene on the GUI to be extremely low, e.g. 3.8 frames per second (FPS) and is CPU bound. Simulations done for 80 000 draw calls in an oilrig have shown that it leads to a CPU load of close to 54% and a GPU load of 13%, and FPS at 3.4. These problems are solved by the present disclosure where the rendering of the 3D scene may be done at 120 FPS with a much lower CPU usage and GPU usage compared to the prior art. The CPU usage may be 3% and the GPU usage may be 3% with the present disclosure. One reason for this is that the number of draw calls may be in the range of 80, as compared to 80 000 for the prior art. 80 draw calls does not involve any overload risk for the CPU and it is therefore being able to sufficiently feed the GPU.

With the present disclosure, merging objects together to fewer bigger VBO's results in fewer draw calls and yields huge performance gains, as compared to the prior art technology. This is due to both the CPU needing to give the GPU less draw instructions and it's easier on the GPU. An issue with merging everything to a single VBO as in the prior art technology is that the track of the sub object's in the 3D scene is lost. The present disclosure solves this by being able to merge the objects together and at the same time keep track of object's using Object ID's.

The geometry of a 3D scene such as an oilrig is complex in that it comprises a large amount of objects, there are a large amount of different object types which requires powerful hardware components when rendering the 3D scene using current technology Furthermore, with for example 80 000 objects in a complex 3D scene such as an oilrig, the total amount of data connected to all objects, i.e. the metadata, is also very large. The metadata for one object may be in the range of 100 MB and in some cases GBs. With the present disclosure, a query search like: ANGL=90.00 may be initiated and all objects with this property will be returned. This is an advantage in order to be able to connect to 3rd party information. For example, if the user clicks on a pipe in a 3D scene representing an oilrig and wants to find the check list for this given type of pipe. The metadata are then parsed to the 3rd party application to find the required metadata.

With the present disclosure, it is possible to select and render a 3D scene comprising multiple 3D objects without having a draw call for each selectable object.

The above description discloses different examples for illustrative purposes. A person skilled in the art would realize a variety of methods for preprocessing, rendering and object picking within the scope of the appended claims.

The invention claimed is:

1. A method for rendering a Three Dimensional, 3D, scene defined by primitives including a number of 3D objects associated with respective vertices to a Graphical User Interface, GUI, by means of a Graphics Processing Unit, GPU, wherein the 3D scene comprises multiple 3D objects, characterized in that all 3D objects are combined in multiple geometry buffers, and in that the method comprises:

processing the 3D scene by creating one unique Object ID for each 3D object and wherein the unique Object ID is common to each vertex included in the same respective primitive, wherein each vertex comprises position, normal and the unique Object ID for each 3D object, and wherein each geometry buffer comprises the vertex including the unique Object ID for all 3D objects;

adding in a metadata database at least one metadata entry per primitive, wherein metadata is associated with the unique Object ID, wherein the unique object ID makes all 3D objects searchable by the metadata, and if there are multiple primitives associated with the same object, multiple Object IDs are correspondingly added to the same metadata database entry;

retrieving material properties from one or more material atlases by means of Object IDs, wherein the one or more material atlases comprises material information about the multiple 3D objects stored as textures together with the associated unique Object ID, and wherein each vertex gets its material information by referencing the unique Object ID, wherein textures are Two Dimensional, 2D, images describing a color value of the vertex, wherein the color value is found by counting the unique object ID in the 2D images returning an associated value for the unique object ID which is used as a pixel value for a Red, Green, Blue, RGB, value of the vertex;

for each of at least one of a unique material of the 3D scene or a unique object of the 3D scene, corresponding shader properties are set, and a draw call is made to the GPU, rendering out a Two Dimensional, 2D, image in an Object ID Frame Buffer by means of a shader, containing the 2D image to be shown on the GUI, wherein each geometry buffer of the multiple geometry buffers is rendered as one draw call, wherein at object picking through the GUI where the 3D object being clicked on is highlighted and metadata is fetched as a result of the clicking, then an additional render to an additional frame buffer is carried out, wherein the additional frame buffer comprises RGB values of the 2D image and the Object ID Frame Buffer comprises the Object ID encoded as RGB, wherein a lookup in the metadata database is done by Object ID and a change in the color value in the one or more material atlases is also done by Object ID such that the color changes the next time the 3D object is rendered.

2. The method of claim 1, characterized in that the one or more material atlases are stored as texture associated with respective Object IDs.

3. The method of claim 1, characterized in that vertices are points in space and additional information is related to color, facing and texture.

4. The method of claim 1, characterized in that the primitive is created from a group of vertices defining a triangle or a line.

5. The method of claim 1, characterized in that the shader is a program to perform a custom transform of processing vertices and fragments.

6. One or more non-transitory computer-readable media storing processor-executable instructions which, when executed by at least one processor in a control unit, cause the control unit to carry out the method according to claim 1.

7. An arrangement for rendering a Three Dimensional, 3D, scene defined by primitives including a number of objects associated with respective vertices to a Graphical User Interface, GUI, by means of a Graphics Processing Unit, GPU, wherein the arrangement is adapted to perform the method according to claim 1.

* * * * *